United States Patent
Goossens et al.

(10) Patent No.: US 6,837,478 B1
(45) Date of Patent: Jan. 4, 2005

(54) ELECTROMAGNET VALVE

(75) Inventors: Andre F. L. Goossens, Rumst (BE); Luc Van Himme, Zaffelare (BE)

(73) Assignee: Continental Teves AG & Co., OHG, Frankfurt (DE)

(*) Notice: Subject to any disclaimer, the term of this patent is extended or adjusted under 35 U.S.C. 154(b) by 104 days.

(21) Appl. No.: 10/129,650

(22) PCT Filed: Nov. 11, 2000

(86) PCT No.: PCT/EP00/11178

§ 371 (c)(1),
(2), (4) Date: May 8, 2002

(87) PCT Pub. No.: WO01/36243

PCT Pub. Date: May 25, 2001

(30) Foreign Application Priority Data

| Nov. 16, 1999 | (DE) | ............................... 199 54 951 |
| Dec. 7, 1999 | (DE) | ............................... 199 58 823 |
| Apr. 4, 2000 | (DE) | ............................... 100 15 599 |

(51) Int. Cl.[7] ............................................. F16K 31/02
(52) U.S. Cl. .................................. 251/129.15; 251/337
(58) Field of Search ....................... 251/129.15, 129.01, 251/337

(56) References Cited

U.S. PATENT DOCUMENTS

| 3,653,630 A | | 4/1972 | Ritsema |
| 4,144,514 A | * | 3/1979 | Rinde et al. .............. 251/129.1 |
| 5,772,179 A | * | 6/1998 | Morinigo et al. ......... 251/129.1 |
| 6,273,396 B1 | * | 8/2001 | Kato ......................... 251/129.91 |

FOREIGN PATENT DOCUMENTS

| DE | 4204417 | 8/1993 |
| DE | 4244444 | 7/1994 |
| DE | 19502671 | 8/1996 |
| DE | 19833102 | 2/1999 |
| DE | 29723707 | 2/1999 |
| FR | 2626711 | 8/1989 |
| WO | 93/08051 | 4/1993 |

OTHER PUBLICATIONS

Search Report of German Patent Office for Appln 10016599.0.

* cited by examiner

Primary Examiner—John Bastianelli
(74) Attorney, Agent, or Firm—Honigman, Miller, Schwartz and Cohn LLP

(57) ABSTRACT

The present invention relates to an electromagnet valve including a valve housing in which a valve closure member is movably guided, a magnet armature fitted to the valve closure member and executing a stroke movement in the direction of a magnet core arranged in the valve housing in dependence on the electromagnetic excitation of a valve coil fitted on the valve housing, and a spring which, in the electromagnetically non-excited valve position, positions the magnet armature at a defined axial distance from the magnet core so that the magnet armature is separated from the magnet core by an interspace. In addition to spring, a spring element that has a non-linear, preferably progressive characteristic curve acts on the magnet armature, the said spring element counteracting the magnet force.

9 Claims, 5 Drawing Sheets

US 6,837,478 B1

ELECTROMAGNET VALVE

TECHNICAL FIELD

The present invention relates to an electromagnet valve.

BACKGROUND OF THE INVENTION

DE 197 00 980 A1 discloses an electromagnet valve of the generic type which, due to the simple design chosen, can exclusively adopt the function of a two-position valve of bistable operation.

Proportional electromagnet valves are also known which, however, necessitate considerable efforts in terms of control technology and construction. An electromagnet valve of this type of construction is described in DE 196 538 95 A1.

The generic application DE 42 44 444 A1 discloses an electromagnet valve which includes a spring element with a non-linear characteristic curve between the magnet core and the magnet armature. The spring characteristic curve extends steeper than the characteristic curve of the stroke force of the magnet armature, and both characteristic curves respectively reach their maximum value when the smallest air slot between the magnet armature and the magnet core is reached.

FR 2626711A discloses an electromagnet which includes a resetting spring and a flexible washer between a magnet armature and a magnet core. The washer is made of a non-magnetic material to prevent sticking of the magnet armature on the magnet core due to remanence after the electromagnetic energization. Therefore, the washer is ineffective over almost the entire magnet armature stroke and not either in the last part of the magnet armature stroke produces a counterforce that weakens the magnet force.

U.S. Pat. No. 3,653,630 also discloses the arrangement of a non-magnetic spring washer between the magnet armature and the magnet core to overcome the force between the magnet core and the magnet armature which is caused by remanence. To this end, the spring washer is spaced from the magnet armature to allow an unhindered stroke of the magnet armature. Under the condition that the magnet armature deforms the spring washer in the direction of the magnet core, the spring washer produces a release force that counteracts the remanence in order to speed up the magnet armature in reassuming its original rest position.

In view of the above, an object of the present invention is to improve upon a bistable electromagnet valve of the generic type and maintain a simplest possible design in such a way that the valve may also be operated as an analog valve or proportional valve, respectively, for volume flow control purposes.

DETAILED DESCRIPTION OF THE PREFERRED EMBODIMENTS

Figure 1:
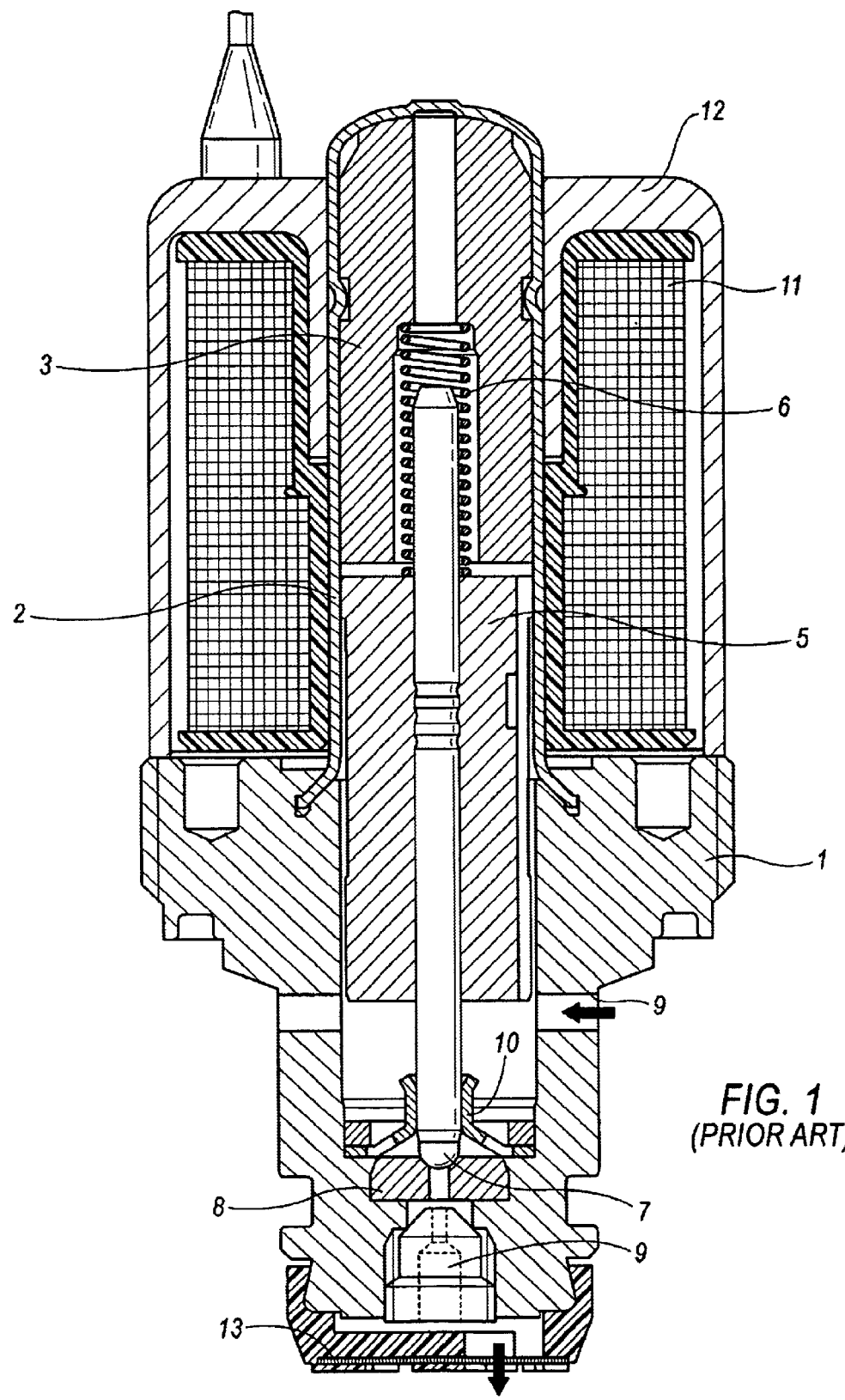
FIG. 1 is a longitudinal cross-section taken through an electromagnet valve that is normally closed in its basic position as known from the art.

The embodiment of FIG. 1 shows an electromagnet valve of the state of the art which is normally closed in its basic position, valve housing 1 of which is exemplarily configured in the type of a cartridge. The top portion of the valve housing 1 is designed as a thin-walled valve sleeve 2 having a cylinder-shaped magnet core 3 attached in its dome-shaped closed area. The piston-shaped magnet armature 5 is placed below the magnet core 3. The magnet core 3 accommodates inside a stepped bore a spring 6 having a linear characteristic curve, the said spring in the capacity of a helical compression spring extending with its one coil end onto the end surface of the magnet armature 5. Consequently, the magnet armature 5, under the effect of spring 6, is pressed with the tappet-shaped valve closure member 7 against a valve seat 8 in the valve housing 1, with the result that a pressure fluid channel 9 which penetrates the valve housing 1 in horizontal and vertical directions is interrupted in the valve's basic position according to the drawing. The tappet-shaped valve closure member 7 is fixed in the magnet armature 5 preferably by means of a press fit and, at its end portion 8 close to the valve seat 8, is centered in a guide sleeve 10 which is fixed in the valve housing 1 concentrically relative to the valve seat 8.

By way of a valve coil 11 fitted to the valve housing 1 and a yoke ring 12 that partly encloses the valve coil 11, the magnetic circuit can be closed by energizing the valve coil 11 and the magnet armature 5 can move in the direction of the magnet core 3.

This initially describes the mode of operation of a normally closed electromagnet valve as known from the state of the art. The bias of spring 6 in this electromagnet valve is required to correspond to the maximum hydraulic inlet pressure in the pressure fluid channel 9 because the inlet pressure in the bore of valve seat 8 is applied to the valve closure member 7. A valve of this type acts in a bistable manner, i.e., it is either closed or open. An intermediate position is not possible. This becomes apparent from the following course of the characteristic curves in FIG. 1a.

Figure 1A:
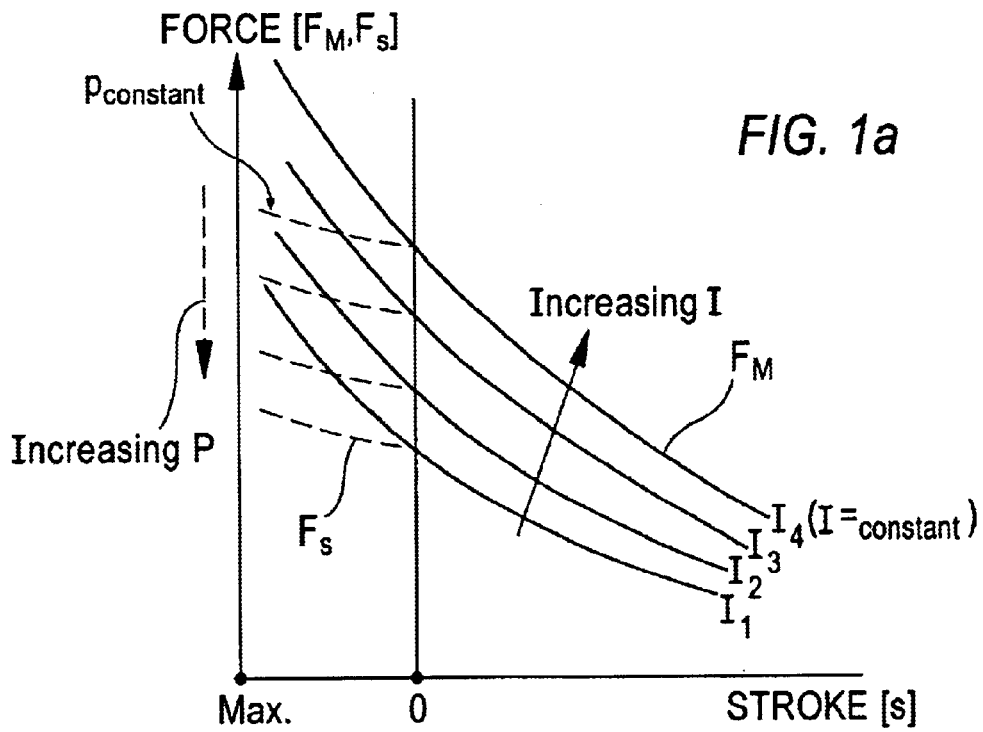
FIG. 1a shows characteristic curves for the electromagnet valve according to FIG. 1.

A hyperbolic system of curves for various magnet force characteristic curves $F_M$ with a respectively constant valve coil current I is plotted as a function of the valve stroke s in the diagram of FIG. 1a. Further, a system of curves Fs relating to the tappet force and having a respectively constant pressure p is plotted as a function of the valve stroke s. The course of this system of tappet-force related curves $F_S$ is predefined by the design of the valve seat 8 and a diaphragm arrangement which is usual in electromagnet valves and is placed in a row to the valve seat 8 and, accordingly, can only be influenced by constructive modifications in the area of the valve seat 8 and also in the area of the valve closure member 7. Corresponding to the selected illustration, the forces $F_M$, $F_S$ and the hydraulic pressures p are plotted along the ordinate, and the valve stroke s is plotted along the abscissa. It must be taken into consideration in this respect that, according to the illustration chosen, the hydraulic pressure p is increasing in the direction of the point of intersection of the ordinate with the abscissa so that the maximum pressure p in the valve's closed position corresponds to the valve inlet pressure in the pressure fluid channel 9. Further points of intersection are produced between the almost linear pressure curves p and characteristic curves of the valve coil current I in the valve's closed position (valve stroke s=0).

It becomes apparent from the diagram of FIG. 1a that a surplus of the magnet force $F_M$ compared to the pressure force that results from the pressure p is active in the operating range of the magnet armature 5 due to the hyperbolic function of the current characteristic curves with increasing valve coil current I when the valve closure member 7 lifts from the valve seat 8, because the air slot between magnet core 3 and magnet armature 5 decreases due to the movement of the magnet armature that is directed to the magnet core 3. The magnet force surplus automatically moves the magnet armature 5 very quickly into the fully opened valve position (valve stroke s=max.). Consequently, the desired intermediate position is not possible for the above-described electromagnet valve according to FIG. 1 which is due to the surplus of magnet force. The magnet force surplus $F_M$ is illustrated in the diagram of FIG. 1a in a very clear fashion by the divergence of the pressure characteristic curve p in relation to the characteristic curve of the valve coil current I as a function of the valve stroke As disclosed in the invention, the magnet force is virtually weakened only by arranging a spring element 4 in the electromagnet valve according to FIG. 1, preferably in the air slot between the magnet armature 5 and the magnet core 3. To this end, the characteristics of the spring element 4 is rated so that the resulting magnet force $F_M$, with the magnet armature 5 approaching the magnet core 3 and, hence, seemingly with increasing valve stroke s in the sense of the valve opening decreases more quickly than the tappet force $F_S$ which results from the hydraulic pressure p at the valve closure member 7 and is basically determined by the hydraulic application of the tappet. According to the present invention, any desired valve stroke position between the bistable limit positions (s=0, s=max,) can be adjusted either by means of appropriate electric current control in the valve coil 11 with a respectively constant pressure p or by controlling the pressure p with a respectively constant valve coil current I. This renders it possible to operate the electromagnet valve not only as a two-way valve but also in the analog operation as a volume flow control valve.

Figure 2:
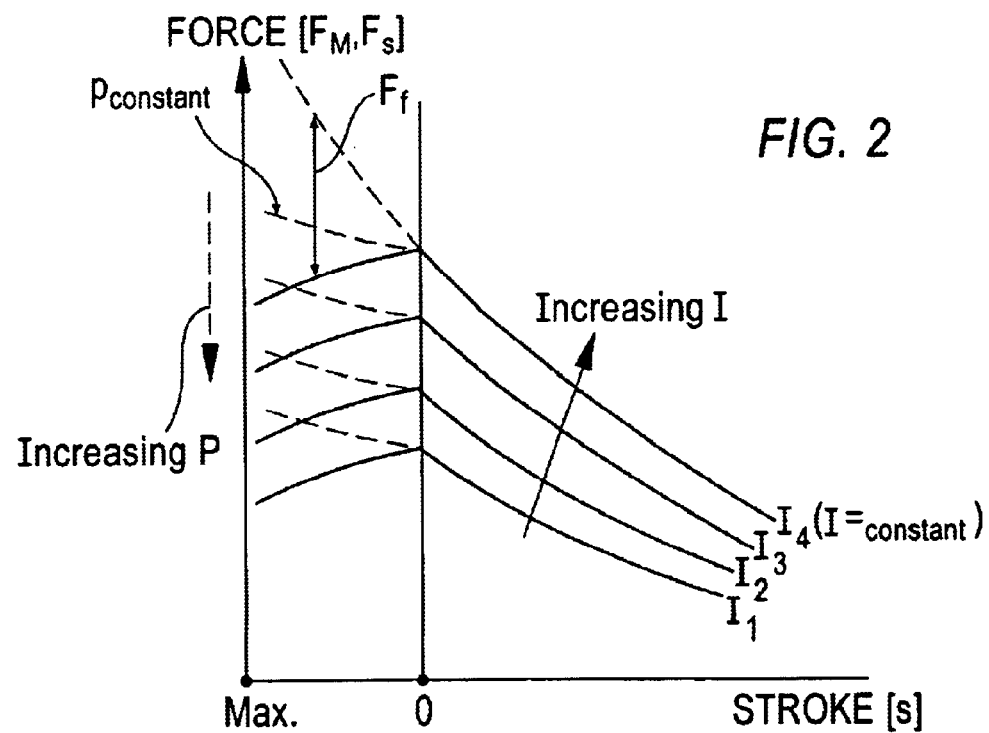
FIG. 2 is a view of the modified characteristic curves after features have been incorporated in the electromagnet valve of FIG. 1 that are essential to the present invention.

Different from the diagram of FIG. 1a, this valve characteristics which is aimed at by the present invention is illustrated in the diagram according to FIG. 2 that differs from FIG. 1a inasmuch as the characteristic curves for the respectively assumed valve coil currents $I_1$ to $I_4$ will no longer rise according to the original hyperbolic function when the valve commences opening (s>0), i.e., when the magnet armature 5 moves towards the magnet core 3, but will extend degressively in the range of the active valve stroke s due to the force effect $F_f$ of the spring element 4.

Figure 2A:
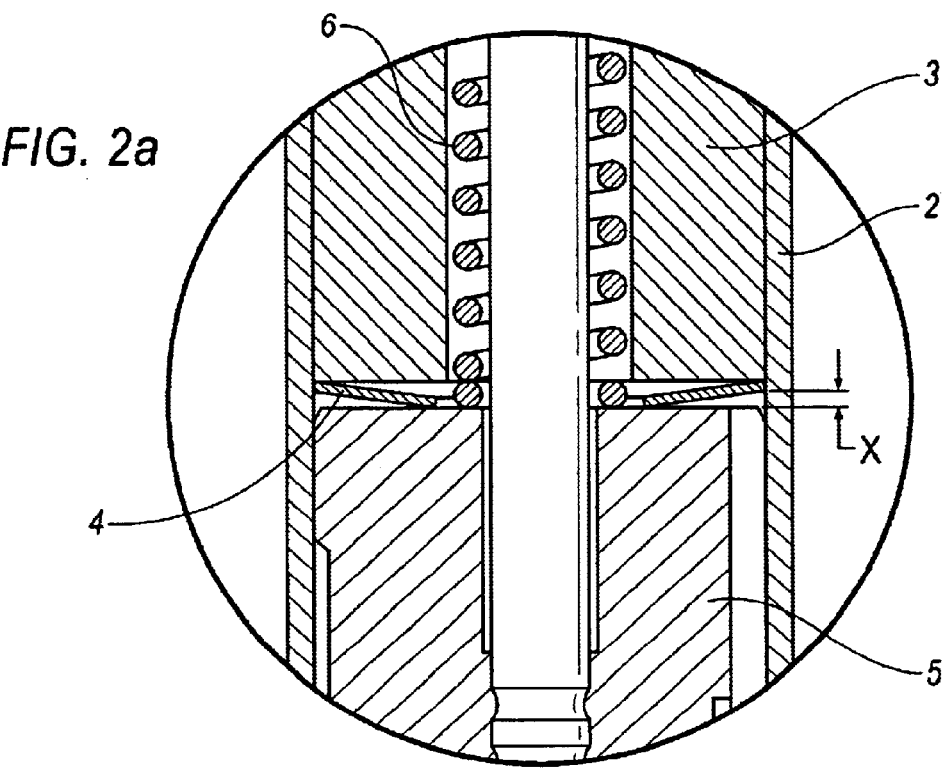
FIG. 2a is an enlarged view of the details that are essential to the present invention for the use in the electromagnet valve of FIG. 1.
Figure 2B:
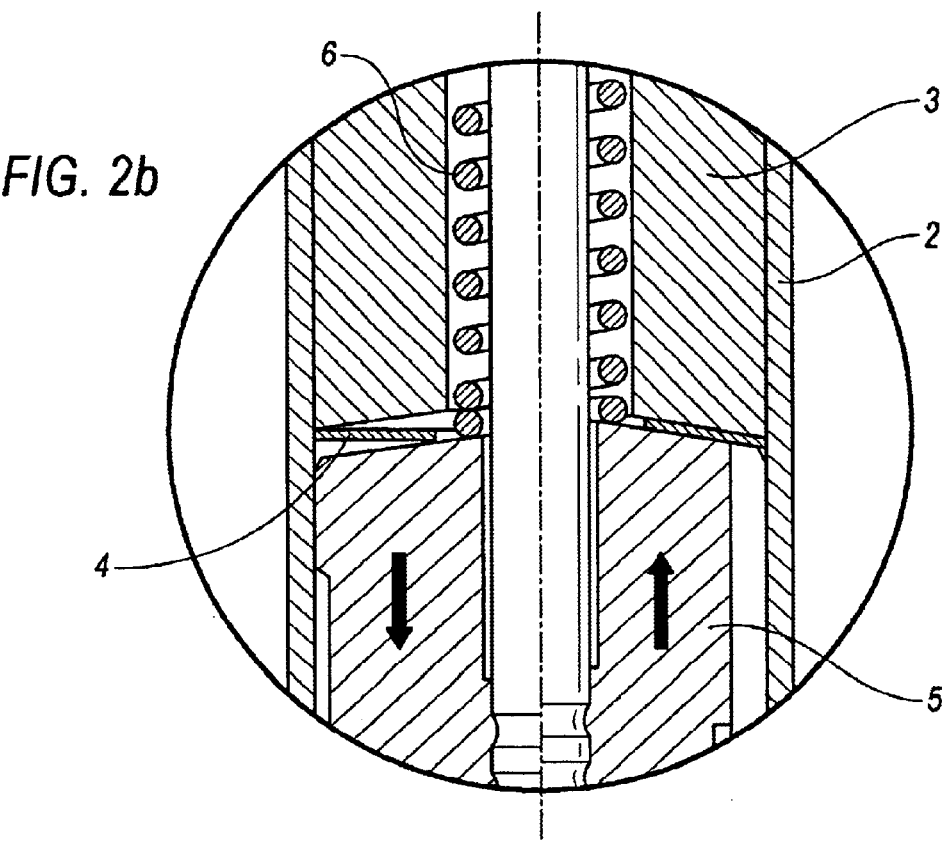

The following embodiments according to FIGS. 2a and 2b illustrate the present invention by way of the constructive individual features shown for an electromagnet valve which is non-energized in the basic position and closed, based on the original design of the valve according to FIG. 1.

FIG. 2a shows an enlarged partial view of the magnet core 3 and the magnet armature 5 with the corresponding constructive modifications compared to the electromagnet valve according to FIG. 1. In consideration of the explanations given with respect to FIG. 1, the electromagnetically non-energized, closed valve switch position can be seen clearly from FIG. 2a wherein the plate-shaped spring element 4 with its outside edge bears against the straight, horizontally extending magnet core end surface, while the inside edge of the spring element 4, in the area of the opening that contains spring 6, is supported on the straight, horizontally extending end surface of the magnet armature 5. The axial distance which exists between the parallel end surfaces of the magnet armature 5 and the magnet core 3 thus corresponds to the maximum magnet armature stroke X after consideration of the thickness of spring element 4. Spring element 4 is preferably comprised of a material that conducts the magnet flow in order to not increase the effective operating air slot unnecessarily so that weakening of the magnet force is advantageously prevented. In the event of electromagnetic energization, the spring element 4 is elastically compressed and applied with its full surface to the straight end surfaces of the magnet core 3 and the magnet armature 5. Due to a spring force $F_f$ of the spring element 4 which is opposed to the direction of movement of magnet armature 5, the magnet armature 5 in addition may be slowed down before it urges the spring element 4 with its full surface against the end surface of the magnet core 3 so that, among others, the switching noise of the electromagnet may also be minimized, if required.

Besides, the biassing force of the spring element 4 causes a possible quick resetting of the magnet armature 5 out of the end position on the magnet core 3 when the electromagnetic energization is ended because the so-called sticking of the magnet armature on the magnet core which is normally caused by remanence is interrupted by the resetting tendency of the spring element 4.

For reasons of manufacture, the spring element 4 in FIG. 2b is simplified and designed as a flat plate or washer which is compressed between the inclined end surfaces of the magnet armature 5 and the magnet core 3. In the present embodiment, the end surface of the magnet core 3 is concavely or funnel-like expanded in the direction of the spring element 4, while the end surface of the magnet armature 5 extends conically at the same angle of inclination as at the magnet core 3 and, thus, is convex. An interchange of the geometry of end surfaces is possible. The result is equally the progressive spring characteristic curve for the plane plate-shaped spring element 4 as is known from a cup spring and is favorable for the present invention. The magnet armature 5 adopts a non-energized position in the left half of the illustration. The right half of the illustration depicts the full-surface abutment and maximum preload of the spring element 4 in the electromagnetically energized switch position of the magnet armature 5.

To permit proper operation of the electromagnet valve closed in the basic position with the features according to FIGS. 1a, 2b based on the electromagnet valve of FIG. 1 by applying the features described in FIGS. 2a, 2b, fluid flow and, hence, pressurization of the valve closure member 7 takes place from below, different from the illustration in FIG. 1, i.e., upstream of the valve closure member 7, by way of the plate-type filter 13 that covers the vertical pressure fluid channel 9 in the direction of the end surface of the valve closure member 7 and, thus, by way of the releasable annular cross-section and through the through-openings arranged in the guide sleeve 10 in the direction of the pressure fluid channels 9 that traverse the valve housing 1.

Figure 3:
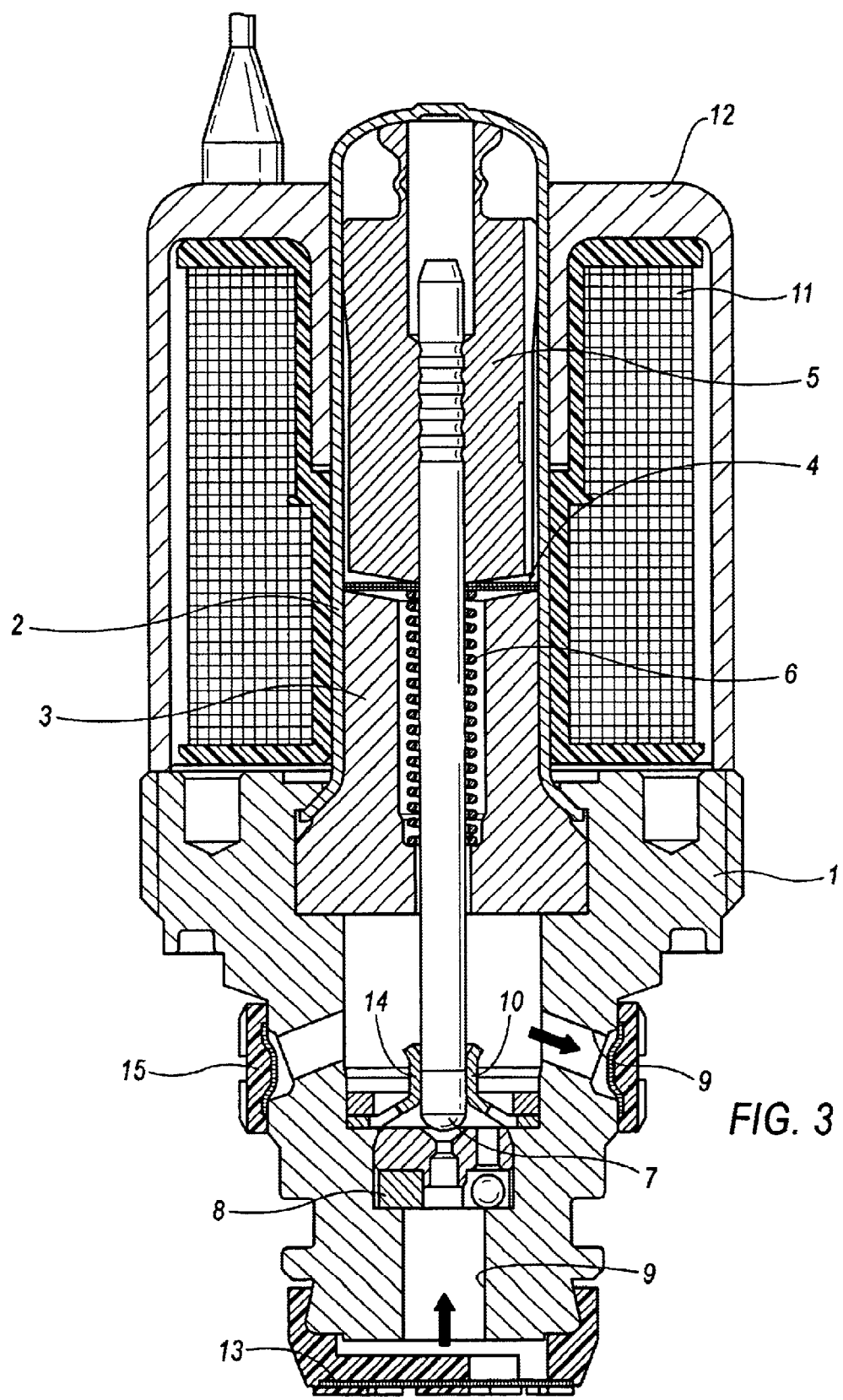
FIG. 3 is a longitudinal cross-section taken through an electromagnet valve that is normally open in its basic position.

Different from the illustrations in the preceding Figures, FIG. 3 shows an application of the subject matter of this invention for an electromagnetically non-excited electromagnet valve that is open in the basic position. Different from the already known design of the valve according to FIG. 1, the magnet core 3 configured as a hollow cylinder is inserted into the bottom end portion of valve sleeve 2 which is secured to the magnet core 3 in the cartridge-type portion of the valve housing 1. The tappet-shaped portion of valve closure member 7 consequently extends through the magnet core 3 in the direction of the closed area of valve sleeve 2 until into magnet armature 5. The end surface of armature 5 is convexly shaped in the direction of the pair of plane spring elements 4, shown exemplarily, and the end surface of magnet core 3 disposed beneath the spring elements 4 has a concave shape. A spring 6 with a linear characteristic curve that is arranged in the through-bore of magnet core 3 extends through the opening of spring element 4 and maintains the magnet armature 5 in abutment on the valve dome in the electromagnetically non-excited basic position, whereby the valve closure member 7 establishes an unhindered pressure fluid passage by way of pressure fluid channel 9. In this valve position, the spring elements 4 which are combined to form a spring assembly abut in a slightly biased manner on the projecting outside edge of the end surface of the magnet core and on the projecting inside edge of the magnet core 5. As has already been mentioned, spring element 4 can be composed of the series arrangement of several individual spring washers which, in the electromagnetically energized valve closing position, are compressed elastically between the end surfaces of the magnet armature 5 and the magnet core 3 only with almost their full surfaces. This is because it must be ensured in a normally open electromagnet valve that the valve closure member 7 closes the valve seat 8 absolutely tightly in the energized magnet armature position, thereby necessitating a minimum residual air slot to remain in the area of the compressed spring element 4 to be bridged by the magnet armature 5. In order to permit proper functioning of the electromagnet valve by applying the features of the present invention, fluid flow and, hence, pressurization of the valve closure member 7 takes place from below according to the illustration, i.e., upstream of the valve closure member 7, by way of the plate-type filter 13 that covers the vertical pressure fluid channel 9, in the direction of the end surface of the open valve closure member 7 and, hence, by way of the released annular cross-section and by way of the through-opening in the tappet centering member 14 in the direction of the pressure fluid channels 9 traversing the valve housing 1. The fluid discharge is thus effected by way of an annular filter 15 that covers the transversely extending pressure fluid channels 9.

Figure 3A:
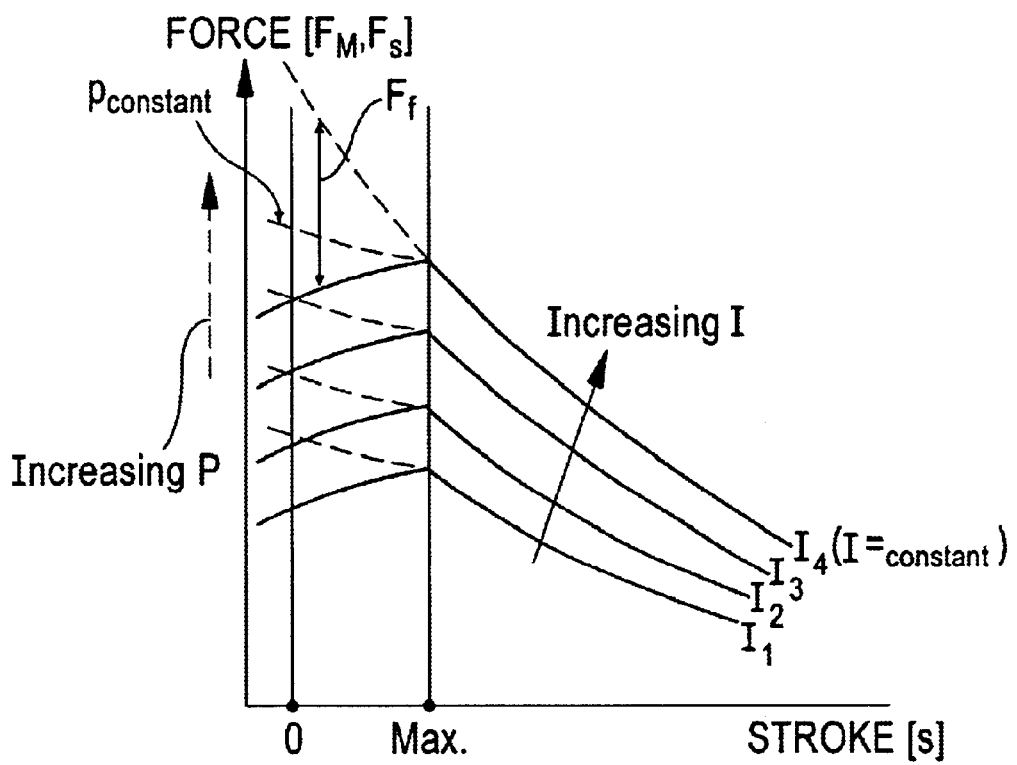
FIG. 3a shows characteristic curves for the electromagnet valve of FIG. 3.

The diagram depicted in FIG. 3a for the normally open electromagnet valve of FIG. 3 differs from the diagram of FIG. 2 only by the interchange of the boundary lines of the valve stroke along the abscissa for the respectively open and closed valve switching position. The mode of operation of the present invention explained by way of FIGS. 2, 2a, and 2b, thus, does not differ in its basic features from the exemplarily selected illustration in FIGS. 3 and 3a so that reference is made to the basic description of the diagrams of FIGS. 1a and 2 for explaining the diagram of FIG. 3a.

Summarizing, it can be pointed out with respect to the examples described above that the use of the plate-shaped, relatively stiff spring element 4 that preferably conducts the magnetic flux is considered as essential feature of the present invention. Said spring element, in the initially non-excited condition of the magnet armature 5, rests between the magnet core 3 and the magnet armature 5 in an only slightly biassed manner and, with an increasing valve stroke, is elastically pressed by the magnet armature 5 against the contour of the magnet core 3. Because the preferably ferritic spring element 4 is no obstacle for the magnetic circuit when the spring element 4 abuts with almost its full surface on the magnet core 3 in the electromagnetically energized end position of the magnet armature 5, the working stroke X corresponds quasi to the air slot being bridged by the magnet armature 5, that means, a residual air slot, as known from the state of the art and weakening the magnetic circuit, does not exist. Additionally, after completion of the electromagnetic excitation, the spring element 4 due to its elastic preload applies a resetting force to the magnet armature 5 which counteracts the residual magnetism and, thus, prevents the undesirable sticking of the magnet armature.

The superposition of the progressive characteristic curve of spring element 4 with the linearly extending characteristic curve of spring 6 permits achieving the precondition for the operation of an originally bistable electromagnet valve as a volume flow control valve, the said operation being simple with respect to control technology.

Principally, the spring element 4 can also cooperate with the magnet armature 5 outside the air slot disposed between the magnet armature 5 and the magnet core 3. However, this entails an increased structural effort which is not related to the subject matter of the present invention.

What is claimed is:

1. Electromagnet valve, comprising:
   a valve housing,
   a valve closure member movably guided in said valve housing,
   a magnet armature fitted to the valve closure member and executing a stroke movement in the direction of a magnet core arranged in the valve housing in dependence on the electromagnetic excitation of a valve coil fitted on the valve housing, and
   a spring which, in the electromagnetically non-excited valve position, positions the magnet armature at a defined axial distance from the magnet core so that the magnet armature is separated from the magnet core by an interspace, wherein in addition to said spring, a spring element acts on the magnet armature which has a non-linear characteristic curve, wherein said spring element counteracts a magnet force created by said valve coil,
   wherein the magnet core and the magnet armature includes either convexly or concavely shaped parallel end surfaces, and wherein said spring element is plate shaped and abuts on an end surface of the magnetic armature and an end surface of the magnet core by way of a lever arm.

2. Electromagnet valve as claimed in claim 1, wherein the spring element is interposed between an end surface of the magnet armature and an end surface of the magnet core.

3. Electromagnet valve as claimed in claim 1, wherein the spring element is configured as an annular washer which, in the electromagnetically non-excited valve switching position, with its profile inside and outside edges abuts on the end surface of the magnet core and the end surface of the magnet armature.

4. Electromagnet valve as claimed in claim 1, wherein said spring/element, said spring, said magnet core, and magnet armature are aligned coaxially relative to a longitudinal axis of said valve.

5. Electromagnet valve as claimed in claim 1, wherein the spring element is arranged in a biassed manner between the magnet core and the magnet armature in the electromagnetically non-excited valve switching position.

6. Electromagnet valve as claimed in claim 1, wherein the spring element is composed of a material which conducts the magnetic flux.

7. Electromagnet valve as claimed in claim 1, wherein the spring element is a cup spring which is arranged between an end surface of the magnet core and an end surface of the magnet armature wherein said end surfaces of said magnetic core and magnetic armature extend in parallel to each other.

8. Electromagnet valve as claimed in claim 1, wherein the spring element is configured as an annular washer and, in the center of said annular washer is penetrated by a spring having a linear characteristic curve.

9. Electromagnet valve, comprising:

a valve housing, a valve closure member movably guided in said valve housing, a magnet armature fitted to the valve closure member and executing a stroke movement in the direction of a magnet core arranged in the valve housing in dependence on the electromagnetic excitation of a valve coil fitted on the valve housing, and a spring which, in the electromagnetically non-excited valve position, positions the magnet armature at a defined axial distance from the magnet core so that the magnet armature is separated from the magnet core by an interspace, wherein in addition to said spring, a spring element acts on the magnet armature which has a non-linear characteristic curve, wherein said spring element counteracts a magnet force created by said valve coil, wherein the spring element is configured as an annular washer and, in the center of said annular washer is penetrated by a spring having a linear characteristic curve.

* * * * *

UNITED STATES PATENT AND TRADEMARK OFFICE
CERTIFICATE OF CORRECTION

PATENT NO. : 6,837,478 B1
DATED : January 4, 2005
INVENTOR(S) : Goossens et al.

It is certified that error appears in the above-identified patent and that said Letters Patent is hereby corrected as shown below:

Column 6,
Line 55, change "said spring/element," to -- said spring element, --.

Signed and Sealed this

Twenty-first Day of June, 2005

JON W. DUDAS
*Director of the United States Patent and Trademark Office*